(12) United States Patent
Reilly

(10) Patent No.: US 6,236,662 B1
(45) Date of Patent: May 22, 2001

(54) MULTIRATE TIME RESERVATION MULTI-ACCESS PROTOCOL

(75) Inventor: Martin T. Reilly, Green Lawn, NY (US)

(73) Assignee: BAE Systems Aerospace Inc., Greenlawn, NY (US)

( * ) Notice: Subject to any disclaimer, the term of this patent is extended or adjusted under 35 U.S.C. 154(b) by 0 days.

(21) Appl. No.: 09/072,159

(22) Filed: May 4, 1998

(51) Int. Cl.[7] ........................................ H04H 1/04
(52) U.S. Cl. .................... 370/462; 370/464; 370/465; 370/478
(58) Field of Search .......................... 370/443, 444, 370/335, 224, 225, 462, 464, 465, 469, 470, 478, 493, 338, 349, 395, 311, 445, 468; 709/228; 455/63; 359/121, 136; 375/221

(56) References Cited

U.S. PATENT DOCUMENTS

| | | | |
|---|---|---|---|
| 4,907,224 | * | 3/1990 | Scoles et al. ................... 370/85.2 |
| 4,987,571 | * | 1/1991 | Haymond et al. ................. 370/85 |
| 5,818,830 | * | 10/1998 | Daane et al. ..................... 370/347 |
| 5,949,776 | * | 9/1999 | Mahany et al. ................... 370/338 |
| 6,011,800 | * | 1/2000 | Nadgauda et al. ................ 370/437 |
| 6,014,722 | * | 1/2000 | Rudin et al. ...................... 710/240 |
| 6,049,548 | * | 4/2000 | Bruno et al. ..................... 370/445 |

\* cited by examiner

*Primary Examiner*—Dang Ton
*Assistant Examiner*—Anthony Ton
(74) *Attorney, Agent, or Firm*—Edward A. Onders; William B. Ritchie

(57) ABSTRACT

A multi node network communications protocol which provides high information throughput at high efficiency, while also maximizing low probability of detection and interception characteristics by optimizing use of transmitting power and other characteristics including but not limited to modulation method, FEC rate and spread spectrum processing gain. The network is optimized by dividing into sub-networks and optimizing the sub-networks to consider local conditions, thus optimizing the overall network to a level of efficiency not possible from a central control point. A protocol which periodically adapts to changing conditions and allows silent entry and exit of nodes as well as providing locations of all nodes within the network.

3 Claims, 4 Drawing Sheets

MULTIRATE TIME RESERVATION MULTI-ACCESS PROTOCOL

BACKGROUND OF THE INVENTION

1. Field of the Invention

The invention relates to multi access communication methods that allow a variable number of users to exchange voice and data information. The methods of the present invention allow for highly optimized throughput rates while also minimizing the probability of network detection and interception; otherwise known as low probability of detection and interception, or LPD/LPI.

2. Description of the Related Art

A central problem of multi-access communications is that of sharing a communications medium between a multiplicity of nodes where each node has random requirements for transmitting or receiving packets of data. The communications medium, acting as a server, does not know which nodes contain packets. Similarly, nodes are unaware of packets at other nodes. If two or more nodes transmit simultaneously to a hidden node, the reception is garbled. If none of the nodes transmits, the medium is unused. This results in an inefficient and underutilization of the communications medium. Likewise, when a transmission requires links through multiple nodes to reach an intended receiver, situations arise where the optimum path is not always selected. Therefore, data packets can arrive out of order where a later sent data packet arrives before an earlier sent one due to selecting a shorter or more optimum path for the later sent packet. While this feature does not present a burdensome problem for voice communications, data communications are another matter.

A number of multi-access communication techniques have been developed to accommodate this generic problem of queuing the data packets in a network configuration in order to minimize collisions. Two basic strategies have been adopted. One is a free-for-all approach in which nodes normally send new packets immediately, hoping for no interference from other nodes. The other strategy deals with scheduling, or reserving, the channel in response to the dynamic requirements of the individual nodes. One communications technique within the free-for-all approach is the Aloha system. When each node in the Aloha system receives a new data packet, the node transmits it immediately rather than waiting. If a data packet is involved in a collision, it is retransmitted after a random delay. If the transmission times for two data packets overlap at all, then the parity checks on those packets will fail and retransmission will be required. A limited type of feedback is provided when the intended receiver rebroadcasts the composite received signal so that each node, after a given propagation delay, can determine whether or not its transmitted packets were correctly received. Maximum efficiency of this system is 18% utilization of the channel.

An improvement to the Aloha system is the Slotted Aloha. The basic idea of this multi-access communications technique is that each unbacklogged node simply transmits a newly arriving data packet in the first slot after data packet arrival, thus risking occasional collisions but achieving a very small delay. When a collision occurs in slotted Aloha, the collision is discovered at the end of the slot by each node sending one of the colliding data packets, creating a backlog. Instead of a backlogged node re-transmitting in the next slot after being involved in a collision, the node waits for some random number of slots before retransmitting to avoid the same collision again. Maximum efficiency of the Slotted Aloha system is double that of the unslotted Aloha system, that is, approximately 36%. However, an advantage of the Aloha system over the Slotted Aloha is that the Aloha can be used with variable length data packets, while the Slotted Aloha requires long data packets to be broken up to fit into slots and short data packets to be expanded to fill up slots.

An improvement in system efficiency over the Aloha and Slotted Aloha techniques can be found in a modified free-for-all approach known as Carrier Sense Multiple Access CSMA. Using CSMA, a data packet is not allowed to start if the channel is sensed to be busy. This technique is critically dependent on the ratio of propagation delay to data packet transmission time. The ratio represents the time required for all sources to detect an idle channel after a transmission ends. A smaller ratio allows CSMA to decrease delay and increase throughput significantly over Aloha type techniques. Nonetheless, the performance of CSMA degrades with an increase in the ratio of the propagation delay to data packet transmission time and thus also degrades with increasing channel rate and with decreasing data packet size. Thus, efficiency varies with the varying lengths of the data packets. However, collisions still occur when two nodes listen and then initiate a transmission to the same node, resulting in garbled data. Slotted CSMA is variation of CSMA in which idle slots have a fixed duration equal to the ratio of the propagation delay to data packet transmission time. In Slotted CSMA, if a packet arrives at a node while a transmission is in progress, the data packet is regarded as backlogged and begins transmission with a certain probability after each subsequent idle slot. The data packets arriving during an idle slot are transmitted in the next slot as usual. This technique is called Nonpersistent CSMA. Efficiency of the CSMA type techniques vary from 30% with CSMA and up to 80% using Slotted CSMA.

Scheduling or reserving the channel provides the other major approach to multi-access communication techniques. System throughput and efficiency can be increased if short packets are sent in either a contention mode or a time division multiplex TDM mode and if the short packages are used to reserve longer noncontending slots for the actual data. Thus, the slots wasted by idles or collisions are all short, leading to a higher overall efficiency. The channel can be reserved by a pre-arranged fixed allocation or can be reserved dynamically. Dynamic reservations further divide into the use of collision resolutions and the use of TDM to make the reservations for channel use.

CSMA/Collision Detection CSMA/CD is an example of the use of collision resolution to make implicit reservations. In this situation, all the nodes hear each other so that when one node transmits a packet, all the other nodes hear that packet. In addition, as in carrier sensing, a node can listen to the channel before transmitting. Finally, it is possible for a node to listen while transmitting, allowing for collision detection. If one node starts transmitting and no other node starts before the signal of the first node has propagated throughout the cable, the first node is guaranteed to finish its packet without collision. Thus, this technique can be viewed as the first portion of a packet as making a reservation for the rest of the data to be exchanged. In terms of system efficiency, CSMA/CD becomes increasingly inefficient with increasing propagation delay, with increasing data rate, and with decreasing packet size.

Collision resolution is more difficult for packet radio nets when not all nodes can hear the transmissions of all other nodes. The complication arises in obtaining feedback on the information sent so as to know which nodes received the data without a collision. The techniques mentioned earlier, such as Slotted Aloha and Aloha, are applicable and to a certain extent, some of the ideas of carrier sensing and reservations can still be used. For example, when an unbacklogged node receives a packet to transmit either a new packet entering the network or a packet in transit that has to be forwarded to another node, it sends the packet in the next slot. If no acknowledgment or ACK of the correct reception arrives within some time-out period, the node becomes unbacklogged when all of its packets have been transmitted and acknowledged or ACKed successfully.

While such multi-access communication methods have proven to be reliable, collision resolution is a central problem that effects system efficiency within the chosen communications medium.

SUMMARY OF THE INVENTION

It is an aspect of the invention to provide a multi-access communications method that is simple to operate, has minimal delay in circuit setup, and does not require complicated system timing and synchronization.

It is another aspect of the invention to provide a multi-access communications method that can handle burst transmissions and continuous traffic in the same manner.

It is another aspect of the invention to provide a multi-access communications method that can handle both virtual circuits and datagram circuits.

It is another aspect of the invention to provide a multi-access communications method that accommodates data packets of variable length.

It is an another aspect of the invention to provide a multi-access communications method that is fault tolerant and self correcting such that if one slot is fully utilized, the other nodes do not attempt to transmit in that slot until it is determined the slot is free.

It is another aspect of the invention to provide a multi-access communications method that utilizes ACKs which have pre-assigned slots in order to avoid collisions.

It is another aspect of the invention to provide a multi-access communications method that has a Low Probability of Intercept LPI.

It is another aspect of the invention to provide a multi-access communications method that accommodates late net entries.

It is another aspect of the invention to provide a multi-access communications method that supports a highly efficient data exchange rate.

It is another aspect of the invention to provide a communications network capable of handling data or voice communications with optimized performance in both throughput rate and LPD/LPI characteristics.

It is another aspect of the invention to provide a network wherein resources are divided into small groups of nodes which autonomously optimize themselves to present local conditions which vary throughout the network, thus optimizing the entire network to an extent not possible from a central control point.

It is another aspect of the invention to allow dynamic tuning of transmission slot lengths to optimize use of resources while handling varying data or voice packet lengths.

It is another aspect of the invention to allow adaptation of resource and protocol use to increase service quality and anti jamming capabilities.

It is another aspect of the invention to optimize data or voice packet throughput while minimizing bandwidth use.

It is a final aspect of the invention to provide a multi-access communications method that accounts for hidden nodes and multi-hop routing.

The present invention is a multi-access communications method for the exchange of datagram and virtual circuit information, having variable packet size and data rates, among multiple users of a communications network. In its most basic form, the method comprises the steps of assessing network resources, verifying an anticipated allocation of the network resources, determining what type of information is to be exchanged, and exchanging the information by a predetermined method dependent upon the type of information to be exchanged.

In the preferred embodiment of the invention, the step of assessing network resources is performed using a P-persistent slotted carrier sense multiple access method to perform predetermined steps and comprises the steps of assessing available network resources, determining the duration of the information to be exchanged, determining the slot number in which the exchange is to begin, determining a subset of the available network resources that is available for the exchange based upon said available resources, the duration of said information to be exchanged, and the slot number in which said exchange is to begin, determining the number of nodes in the network, determining the neighbor table matrix, determining which of a plurality of slots are occupied, determining which slots, frequencies, and PN code channels may be re-used without interfering with other nodes within the network, determining which slots are unoccupied, and determining which unoccupied slots are available for a given exchange based upon said number of nodes in the network, said plurality of slots, frequencies, and PN code channels that may be re-used without interfering with other nodes within the network, said duration of said information to be exchanged and said number of said slot in which said exchange is to begin.

In the preferred embodiment, the step of exchanging information is dependent upon whether the information to be exchanged is datagram or virtual circuit information. If virtual circuit information, the steps of accessing a channel, sending a request packet, commandeering a predetermined subset of network resources, receiving an acknowledgement, and exchanging the information are followed. If the information is datagram information, the same process is followed, but system does not wait for receipt of an acknowledgement before exchanging the information.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
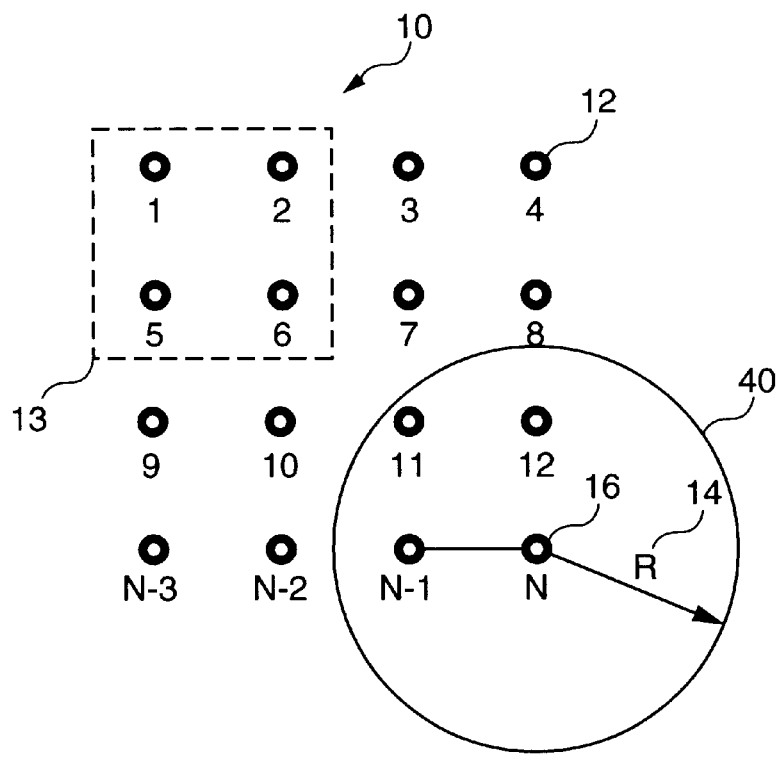
FIG. 1 illustrates a typical system configuration that can be used with the invention.

Turning to FIG. 1, the invention is a protocol intended for use with all layers of multi node network 10 including, but not limited to, media access, logical link, and network layers. The network 10 illustrated in FIG. 1 is made up of nodes 12 numbered through "N", for this example, arbitrarily placed where the actual number of nodes 16, "N", is constantly subject to increase or decrease. The network is divided into sub networks 13 of nodes 12. Nodes 12 within any given sub-network 13 are connected by radio frequency RF links. The maximum range 40 of an RF link 14 is "R" meters and therefore a sub-network 13 of nodes 12 will be made up of a group of nodes 12 located within a circle of a radius 14 equal to "R". Because of this limited transmission range in comparison to the overall size of the network 10, multi hop relaying may be required to provide end to end service across the network 10.

The network 10 is partitioned into sub-networks 13 using either frequency or code division without impacting network operation. Sub-networks 13 may be assigned individual arbitrary PN codes unknown to any other sub-network 13 without adverse effects. In this way, each sub-network 13 may provide multi-level secure communications. Routing among the sub-networks 13 is accomplished by sharing PN codes among the participating subnetworks 13 along the route only.

Figure 2:
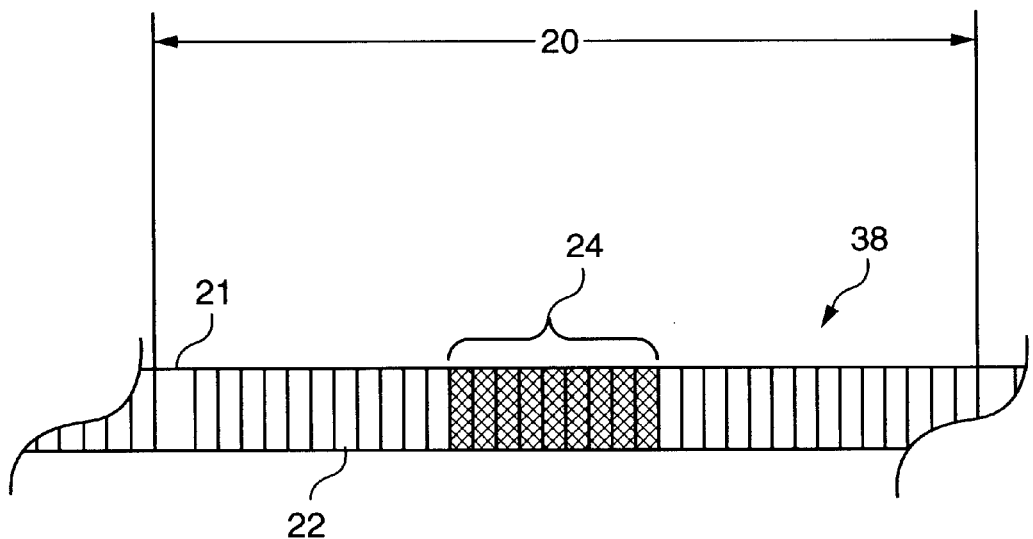
FIG. 2 is a timeline showing one period of the wave form used to optimize the use of time on a given channel.

Referring to FIG. 2, a periodic frame 20 is defined having a predetermined duration, T frame, typically on the order of hundreds of milliseconds. The duration 38 of periodic frame 20, T frame, is further subdivided into a series of "mini-slots" 22 of a predetermined duration, T quantum, proportional to the maximum transmission range, R, of the nodes divided by a multiple of the propagation delay of the network. Mini-slots 22 are numbered consecutively from one to K, where K is the integer multiple of T quantum that yeilds T frame. The first slot in the periodic frame 20 is defined as the start of frame slot 21. An initialization algorithm is performed to determine a pertinent network and frame parameters including the number of nodes, the connectivity between adjoining nodes, any network partition, the frame time and a channel time quantum. This information is shared with all other nodes in the network. Allocated resources 24 within the periodic frame 20 are slotted in order to maximize the number of free mini-slots 22 within the periodic frame 20, allowing for additional allocations and an acknowledgement (ACK) from a destination node that there are no conflicts with a transmitted resource allocation.

Figure 3:
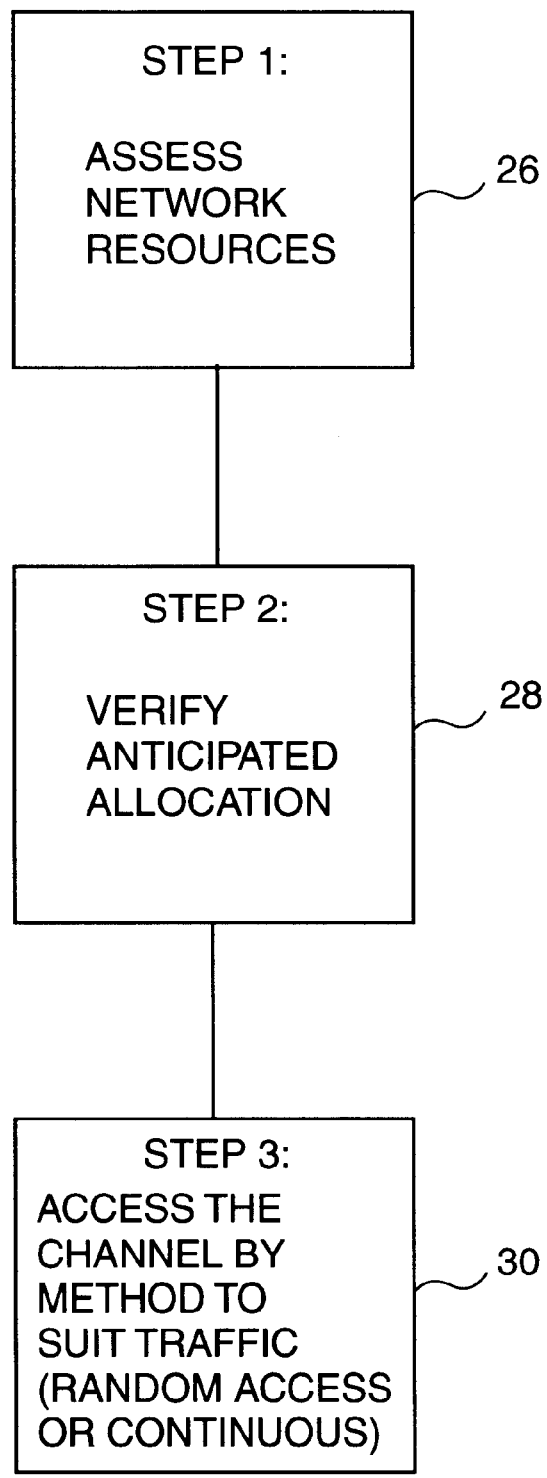
FIG. 3 is a process diagram illustrating the dynamic 3 step process which facilitates network resource allocation.

Referring now to FIG. 3, the present invention utilizes a dynamic three-step process 26,28,30 to optimally allocate network resources. In step one 26, all nodes check an available pool for free to determine the total number of nodes within the network, the neighbor table matrix which specifies which nodes are directly connected RF links to define the sub-networks (S), and which mini-slots are occupied, denoted in the present system as "U". Based upon this information, an algorithm, Afree is run locally to a node to determine which subset of the available slots is available for a given transmission. Afree, processes the neighbor table matrix referenced in step one to determine which time slots, frequency, and or PN code, also referred to as direct sequence pseudo-random noise spread spectrum modulation (DSPNSS), channels may be re-used by each node without interfering with other nodes within the network. In this context, interference is defined as the reception of energy from an undesirable node at the specified node that significantly decreases overall network performance. The result of Afree is a function of N, S (the algorithm that partitions the network into sub-networks), the data duration, the slot number, in which the data transmission starts, and the set of occupied slots, U. As Afree is dependent upon N and S, nodes more than two hops away from one another may utilize the same resources e.g. slots, frequency, and PN code, without interfering with each other. To accomplish this multiple allocation, a scale factor, k, is chosen so as to accommodate the expected overall traffic load, taking into account resource reuse and multi-hop relaying of traffic.

Figure 4:
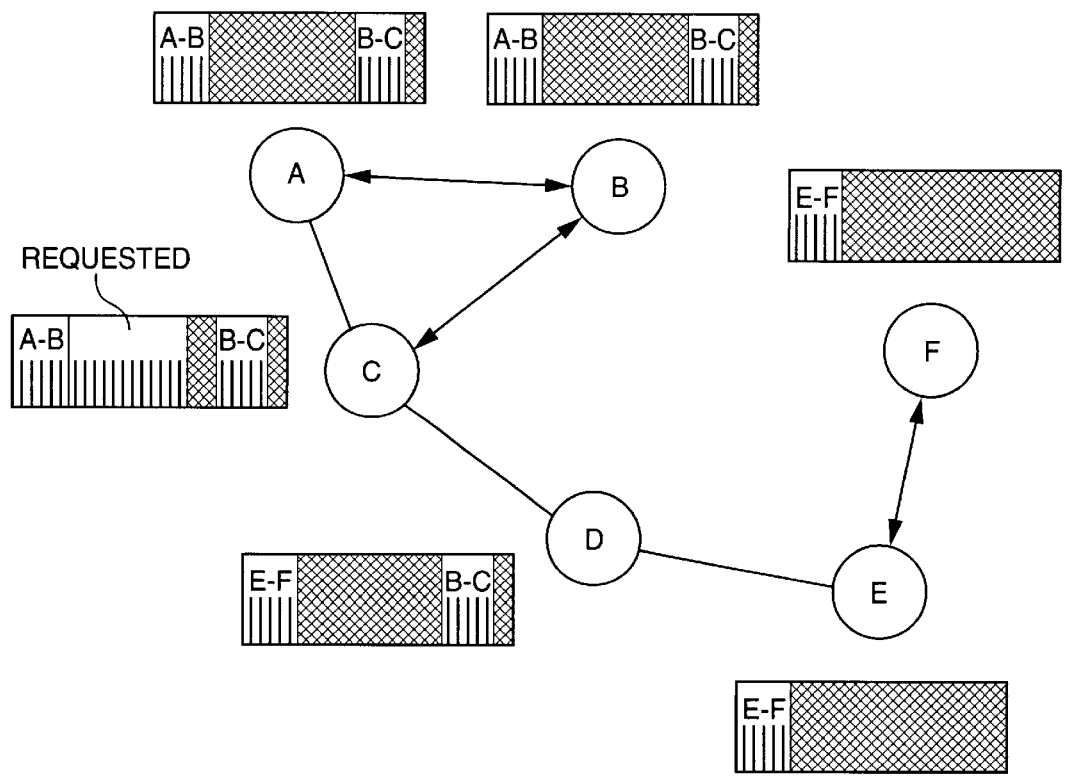
FIG. 4 is a diagram illustrating a number of sub-networks with each node's view of the sub-networks of which they are members.

FIG. 4 illustrates a number of sub-networks with each node's view of the subnetworks of which they are members. Nodes A, B and C would constitute a sub-network, with node D being a nearest neighboring node and nodes E and F being a secondary and third neighbor nodes to sub-network ABC. S is the algorithm that partitions the network into sub-networks. A practical value for T quantum in this situation would be the duration of an initial request transmission as this provides sufficient time for all nodes on the same sub-network to achieve channel sensing for the CSMA protocol. For nodes in other sub-networks which do not have knowledge of the transmitters' PN code, this also provides sufficient time for the intercept receivers of the nodes in other sub-networks to integrate enough energy to determine channel activity and obtain received signal energy. Thus by coordinating information from multiple receivers within the same sub-network, range and position location may be determined for all users of all sub-networks.

In step two 28 of the process 26,28,30 illustrated in FIG. 3, all nodes verify that their anticipated allocation of slots will not significantly effect others within and outside of the given nodes' respective sub-network. This may be accomplished using the techniques set forth in Scheduling Algorithms for Multi-Hop Radio Networks; S. Ramanathan and E. Lloyd; IEEE/ACM Transactions on Networking (April, 1993) incorporated herein by reference. In some embodiments, a feature detector is used to permit monitoring of operations outside a given nodes' sub-network without knowledge of transec keys in non LPD/LPI modes. Virtual circuits are defined as dedicated routes through the network 10 in which resources are committed until released by the tasked node. Datagram service utilizes available resources on a non-reserved, as available, basis for short duration bursts of traffic such as keyboard entry. However, these two techniques are not mutually exclusive as a node may receive and / or transmit both virtual circuit and datagram traffic.

Step three 30 of the process 26,28,30 of FIGS. 3 is dependent upon the needs of a user. If a network user requires random access for tasks such as keyboard entry transmissions, the tasked node will access the channel using P-Persistent Slotted CSMA protocol to send a packet datagram. This packet will be transmitted only in the slots determined to be free by running algorithm Afree. Should the tasked node require reserved access for tasks such as file transfer or multimedia communication, where the amount of data will far exceed the capacity of an individual data block and thus require an extended stream of data blocks, the tasked node requests confirmation for conflict free operation from other nodes within it's network group or sub-network, using P-Persistent Slotted CSMA protocol, to establish a virtual circuit. As was the case with the datagram request, this request is transmitted only in the slots determined to be free by running algorithm Afree.

Once the request has been made, the node then commandeers the approved resources. The commandeering of resources requires that the request packet contain the number of slots allocated to said node and the data duration; possibly undetermined signifying an infinite count. Upon receipt of the request, neighboring nodes send an acknowledgment ACK packet in one of the slots of the requesting node. These ACKs contain the requested allocation so that neighboring nodes of the tasked nodes' immediate neighboring nodes are made aware of the allocation, thus minimizing secondary conflicts. In FIG. 1, for example, node number 10 would be aware of a request for resources from node number 12. In order to minimize transmissions and thus the probability of detection, nodes that cannot approve the request do not transmit negative replies, rather the lack of an ACK is assumed to be a rejection. Should an ACK not be received from a given node, the tasked node relinquishes control of requested resources, i.e. the network self corrects by preventing the tasked node from occupying the requested slots. Similarly, when a collision occurs with the ACK packet, all nodes are made aware of this fact by the lack of receipt of an ACK packet and the procedure is repeated. In this case, the system performs like a datagram, minimizing inefficiencies due to slots not being used and allowing the network to have high bit error rate tolerance.

Once successful ACKs are received, the tasked node immediately transmits the required information using Enhanced Reservation TDMA protocol. All of the nodes in the network are aware of this use of resources and all update their data on occupied slots, U. The tasked node maintains control of the resources for this transmission stream until it relinquishes them, thus maintaining a virtual circuit. When non-tasked nodes sense the channel in use is free for a predetermined number, Navailable, of contiguous frames 22, 24, it is deduced that said node 12 is no longer transmitting and has given up the resource. The U data is then updated locally and the process begins again. By sensing the relinquishment of a channel, inefficiency is further minimized as no signal needs to be sent to inform other nodes of the end of a given transmission. In all cases, Navailable 50 is chosen to achieve a given false alarm probability.

Should the transmitting node require acknowledgment of successful data receipt at the target node, the nodes along the transmission path perform a passive acknowledgment by re-transmitting the data. The final destination node adds additional slots to its resource request to accommodate the active ACK from the final destination node back to the previous node. This procedure guarantees there will be no collisions of the ACKs and there will also be no excess overhead or network management transmissions associated with them, thus enhancing the LPD / LPI characteristics of the system.

The process described above is a significant enhancement to the P-Persistent CSMA protocol. The maintenance of the occupied slot data, U, and constant monitoring of channel conditions, referred to as "painting a picture" of the environment, allows the network to accommodate potentially fragmented traffic with the desired quality of service and without adversely effecting links to other nodes to the point where they can no longer provide the required services. This constant maintenance of data and channel conditions allows the present system to transmit even when there is a busy slot within the period of the waveform as, by varying parameters e.g. reducing transmit power levels during these busy slots, it is possible to transmit in the clear sections of the wave form period.

When painting a picture of the environment, nodes either utilize energy detectors to detect the presence of energy emitters over a given mini-slot, or utilize feature detectors to determine key features of that signal, e.g. received energy, Tx frequency, chip rate, hop rate, etc. These devices enable the invention to classify emitters, to monitor the channel / environment, and to catalog the resources used by other nodes which are not in the LPD/LPI mode. This process "paints" a view of nodes both inside and outside of a given node's sub-network by neighbor to neighbor relaying. Thus, when a node joins the network, or fails to receive the periodic update detailed below in reference to network configuration, the node may learn the current network configuration by passively monitoring the activity of other nodes within the newly joined nodes' local sub-network. Due to this fact, nodes joining or already in the network do not need to transmit unless they are tasked with information to send; effectively reducing the transmission traffic and lowering the probability of detection or interception.

Transmitted energy from network nodes must also be minimized for LPD/LPI performance. In the present system, this is accomplished by adapting the transmission based upon a painted picture. In operation, each node has knowledge of the immediate neighboring nodes' traffic requirements, when they will transmit, and their estimated ranges. Based upon this information, nodes may determine the total impact of the radiation from all nodes on any given receiving node, both within and outside of a sub-network of a given node, and adapt transmit power and /or modulation method, forward error correction (FEC), spread spectrum processing gain, or other transmission attributes accordingly. This adaptability serves to enhance the LPD/LPI characteristics of the entire network by minimizing network management or "overhead" traffic.

Network layer issues, such as routing decisions, are affected by channel conditions such as the amount of RF energy upon distant nodes, and LPI operation. In the present system, these routing decisions are made to avoid LPD/LPI threats and to avoid adversely effecting the link quality of other pairs of nodes. As discussed above, S and N are updated periodically to account for late entries, drop outs, and mobile motion. The present system adjusts the time constant of these update algorithms to account for the nodal dynamics, the dominating factor that determines this periodicity, with some hysterisis built into the update algorithms to avoid transient drop outs. By updating network information at optimized intervals, routing decisions may be made to avoid threats while maintaining link quality.

Figure 5:
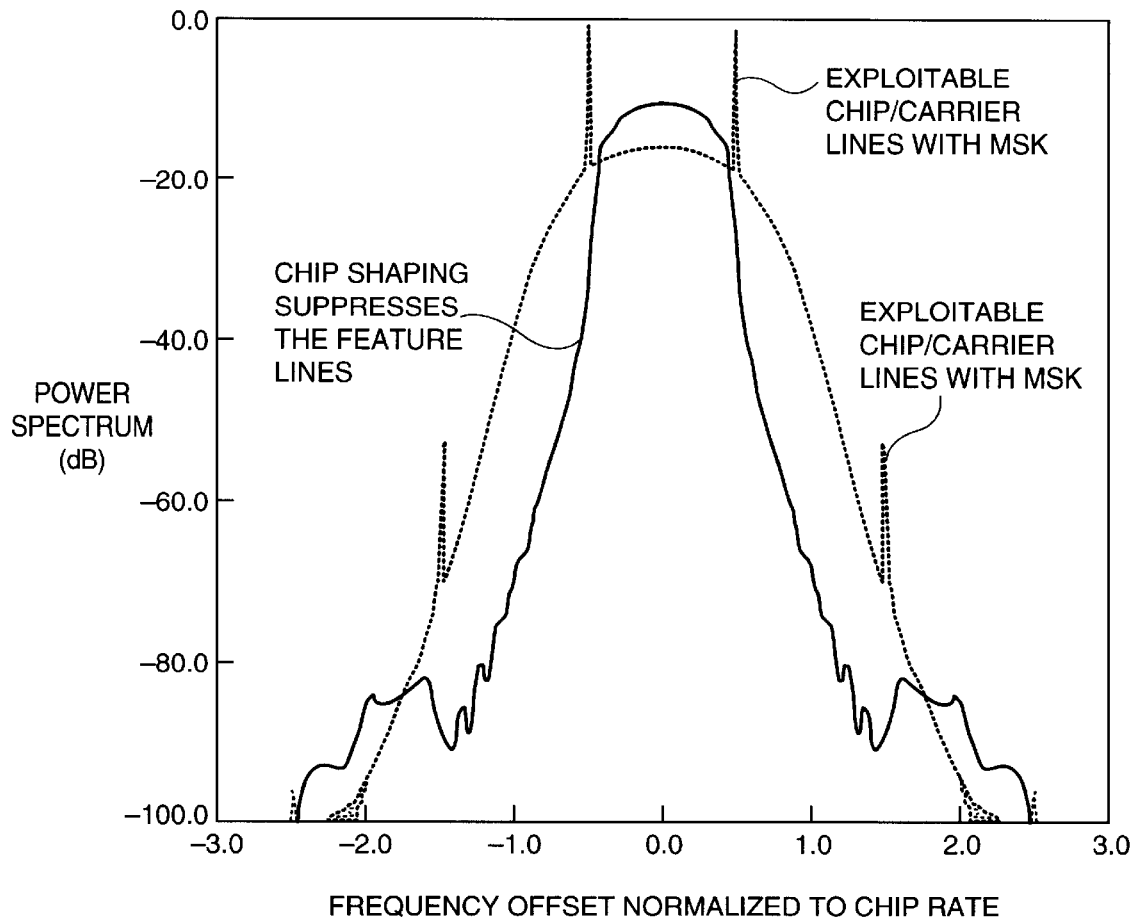
FIG. 5 is a graph of frequency offset normalized to chip rate versus the power spectrum (in dB) for filtered and unfiltered signals.

Conventional spread spectrum designs have often been touted as providing LPI/LPD merely by adding power control. However, well-informed designers know that such designs perform poorly against the practical worst-case threat of feature detection. Specifically, nonlinear feature detectors can have tens-of-dBs greater sensitivity in the typically non-stationary noise background. As FIG. 5 illustrates, for a conventional spread spectrum technique, namely MSK-PN the impulses that pierce the background noise enable stable narrowband filtering (i.e. long-term smoothing) before detection by a feature detector. In addition, the frequency location of these filtered impulses also indicates the signal's chip rate, further identifying the signal. These spikes, and hence the detectability of the signal, are eliminated when the LPI modulation of the present invention is used. By combining an improved LPI/LPD design with a bandwidth efficient (BE) design in which waveforms and modulation are dense to allow the amount of information transmitted per Hz of bandwidth occupied by the signal to be increased, the present invention provides a unique adaptable multi-mode waveform that is far less susceptible to feature detection than current systems.

While there have been described what are preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A multi-access communications method for the exchange of datagram and virtual circuit information, having variable packet size and data rates, among multiple users of a communications network, said multi-access communications method comprising the steps of:

assessing available network resources, said assessment comprising the steps of:
   determining a number of nodes in said network: determining a neighbor table matrix; and
   determining which of a plurality of slots are occupied;
   determining a duration of information to be exchanged;
   determining a number of a slot in which said exchange is to begin;
   determining a subset of said available network resources that is available for said exchange based upon said available network resources, a duration of said information to be exchanged, and a number of a slot in which said exchange is to begin;
verifying an anticipated allocation of said network resources;
determining a type of said information to be exchanged;
determining a means to exchange said information based upon said type of information; and
exchanging said information.

2. The multi-access communications method as claimed in claim 1 wherein said step of assessing available network resources further comprises the steps of:
   determining which of a plurality of slots, frequencies, and PN code channels may be re-used without interfering with other nodes within the network;
   determining which of said plurality of slots are unoccupied;
   determining a subset of the plurality of unoccupied slots available for a given exchange based upon said number of nodes in the network, said plurality of slots, frequencies, and PN code channels that may be re-used without interfering with other nodes within the network, said duration of said information to be exchanged and said number of said slot in which said exchange is to begin.

3. The multi-access communications method as claimed in claim 2 wherein said step of assessing available network resources further comprises using a P-persistent slotted carrier sense multiple access method to perform predetermined steps.

* * * * *